(12) United States Patent
Chaves et al.

(10) Patent No.: US 7,822,771 B1
(45) Date of Patent: Oct. 26, 2010

(54) SEARCH QUERY GENERATION

(75) Inventors: Michael Chaves, Cary, NC (US); Larry L. Terhune, Apex, NC (US); Susan Jamie Borofsky, Cary, NC (US); Jason A. Stone, Holly Springs, NC (US)

(73) Assignee: Teradata US, Inc., Miamisburg, OH (US)

( * ) Notice: Subject to any disclaimer, the term of this patent is extended or adjusted under 35 U.S.C. 154(b) by 515 days.

(21) Appl. No.: 10/668,838

(22) Filed: Sep. 23, 2003

(51) Int. Cl.
*G06F 17/30* (2006.01)

(52) U.S. Cl. ............... 707/781; 707/721; 707/759; 707/784; 707/999.004; 715/764; 715/810; 715/968

(58) Field of Classification Search ............... 707/3, 707/9, 102, 781, 999.004, 4, 5; 715/764, 715/810, 968
See application file for complete search history.

(56) References Cited

U.S. PATENT DOCUMENTS

| | | | |
|---|---|---|---|
| 5,895,465 A * | 4/1999 | Guha | 707/4 |
| 5,948,040 A * | 9/1999 | DeLorme et al. | 701/201 |
| 5,953,726 A | 9/1999 | Carter et al. | |
| 6,085,187 A | 7/2000 | Carter et al. | |
| 6,334,131 B2 * | 12/2001 | Chakrabarti et al. | 707/10 |
| 6,460,025 B1 | 10/2002 | Fohn et al. | |
| 6,826,572 B2 * | 11/2004 | Colace et al. | 707/10 |
| 7,003,730 B2 * | 2/2006 | Dettinger et al. | 715/764 |
| 7,447,676 B2 * | 11/2008 | Zait et al. | 707/3 |
| 2004/0254920 A1 * | 12/2004 | Brill et al. | 707/3 |
| 2004/0260685 A1 * | 12/2004 | Pfleiger et al. | 707/3 |
| 2005/0044065 A1 * | 2/2005 | McArdle | 707/3 |

* cited by examiner

*Primary Examiner*—Apu M Mofiz
*Assistant Examiner*—Monica M Pyo
(74) *Attorney, Agent, or Firm*—Schwegman, Lundberg & Woessner

(57) ABSTRACT

Methods and systems provide automatic search generation capabilities. A search constraint and a control field identifier are received. A search generating module generates a search that when executed returns records from a data store. The records satisfy the search constraint and have identical values for the control field identifier for unique customer identifications.

14 Claims, 2 Drawing Sheets

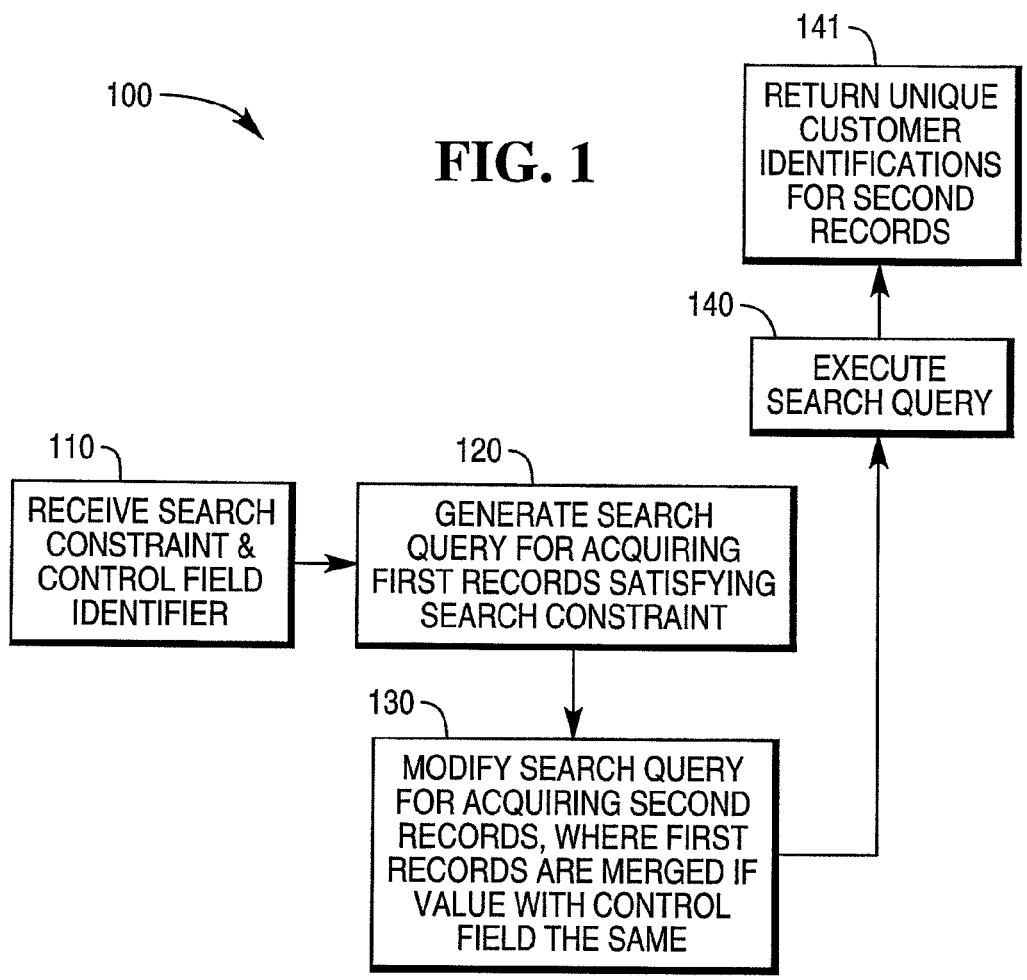
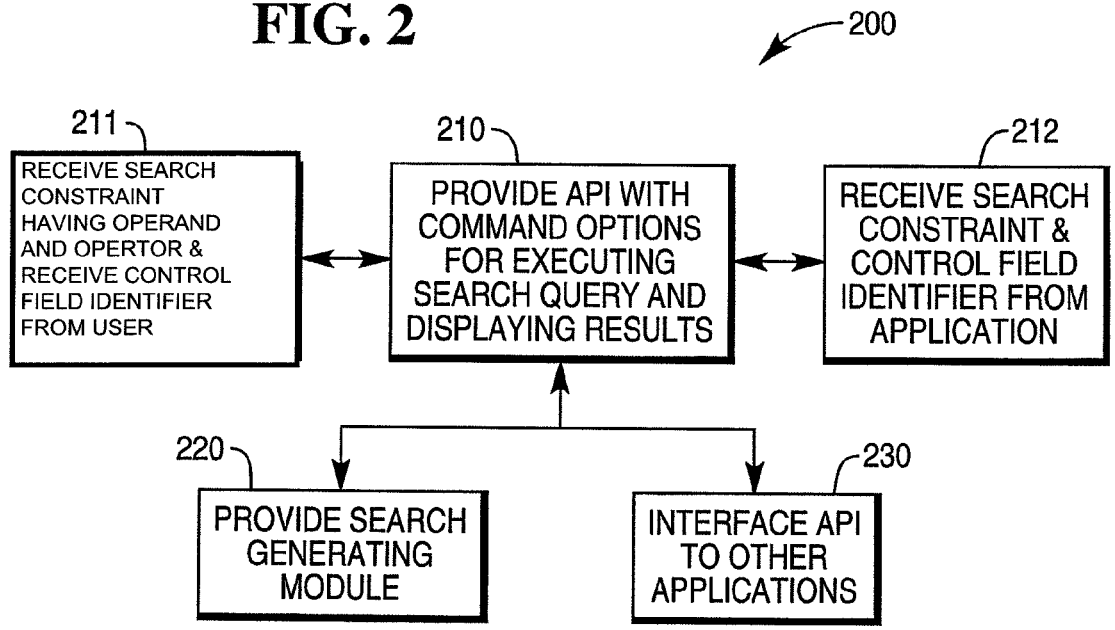

SEARCH QUERY GENERATION

FIELD OF THE INVENTION

The present invention relates to electronic marketing campaigns and in particular to techniques for generating search queries for customer segmentation populations associated with marketing campaigns.

BACKGROUND OF THE INVENTION

Organizations have created a wealth of electronic information over the recent years that relates to their customer transactions. This information is continually reorganized, linked to other information, and analyzed by the organizations in an attempt to improve customer relationships and increase revenue via customized marketing campaigns.

One technique for increasing revenue includes developing a customer segment population using a given set of search criteria that is designed to capture the desired population. Conventionally, a business analyst, who is knowledgeable and responsible for a particular customer segment, will develop the search criteria. The criteria are then passed to a search specialist (programmer) for developing and implementing an executable search that embodies the search criteria.

The business analyst executes the search and receives results back from a data warehouse, and the results include unique customer identifications. These customer identifications define the business analyst's customer segment population for a desired marketing campaign. The marketing campaign is designed by the business analyst to increase the organization's revenue for goods or services.

The entire search generation process is time consuming and expensive because search specialists are generally coveted organizational resources that are expensive and have limited availability. As a result, business analysts will submit search query requests that are often placed in a search specialist's work queue and are often not timely addressed. During this time lag, a business analyst may find that market conditions have changed and that the original search query request is no longer needed or is now irrelevant in view of the elapsed time. Additionally, the business analyst may have developed several other search query requests for other marketing campaigns and may have added those requests to the search specialist's work queue.

Therefore, there is a need to eliminate the dependency of search specialists, such that business analysts can generate their own search queries in an immediate and timelier manner.

SUMMARY OF THE INVENTION

In various embodiments of this invention automatic search generation techniques are taught. More specifically, and in one embodiment, a method for automatically generating a search query is presented. Initially, a search constraint and a control field identifier are received. Next, a search query is automatically generated. The search query, if executed, returns first records of a data store satisfying at least a portion of the search constraint, and each of the first records include a control field identifier value. The search query is also automatically modified so that if the search query is executed it returns second records. The second records include a number of the first records merged with one another if the first records include a same control field identifier value and are associated with a same customer identification value.

In still another embodiment of the present invention, another method for providing a search query is taught. An Application Programming Interface (API) is provided for receiving a search constraint and a control field identifier. Also, a search generating module interfaced to the API is provided for automatically generating a search query from the search constraint and the control field identifier. If the search query is executed, then records from a data store are returned representing data store records that satisfy the search constraint and have identical values for the control field identifier for each customer identification value.

In another embodiment of the present invention, a search query generation system is described. The search query generation system includes a search query interface and a search generating module. The search query interface is operable to receive a search constraint and a control field identifier. Moreover, the search generating module generates a search query by using the search constraint and control field identifier to return records of a data store that satisfy the search constraint and have identical values for the control field identifier when associated with a same customer identification value.

In yet another embodiment of this invention another search query generation system is presented. The search query generation system includes a data store and a search generating module. The search generating module can generate a search query. Further, the search generating module uses a search constraint and a control field identifier to construct the search query. The search query, when executed, returns records from the data store, which satisfies the search constraint and have identical values for the control field identifier for a same customer identification value.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

BRIEF DESCRIPTION OF THE DRAWINGS

FIG. 1 depicts a flow diagram representing a method for generating a search query, according to one embodiment of the invention;

FIG. 2 depicts a flow diagram representing another method for generating a search query, according to another embodiment of the invention;

DETAILED DESCRIPTION OF THE INVENTION

Figure 3:
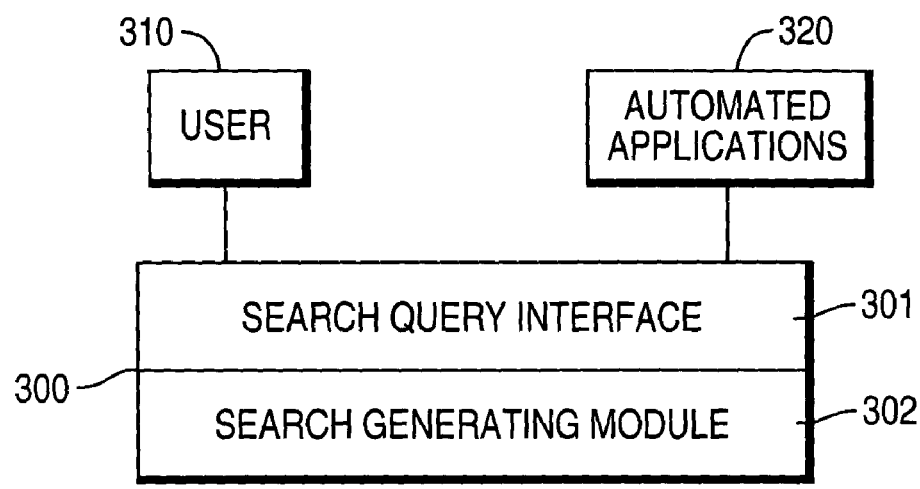
FIG. 3 depicts a block diagram representing a search query generation system, according to one embodiment of the invention.

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims and their equivalents.

As used herein a "search constraint" includes one or more searching operators and one or more search operands used to construct an electronic search query. The operands can include field names associated with a data store and field values. The values can be constant character strings, wild carded character strings, or numeric strings expressed in arithmetic terms, such as equal to, not equal to, less than, greater than, less than or equal to, or greater than or equal to.

A "control field identifier" is a field of a data store that is used with the search constraint when generating search queries for embodiments of this invention. The control field identifier is separate and not part of the search constraint. The control field identifier is used for identifying a field in the data store for which the generated search is to perform a searching join or merge operation.

One embodiment of the invention is implemented within the Teradata CRM product using the Teradata data warehouse and distributed by NCR Corporation of Dayton, Ohio. Furthermore, various embodiments of this invention are presented as examples that are related to the travel industry. These examples are illustrative and are not intended to be limiting, although the embodiments of this invention are particularly beneficial and useful in the travel industry.

FIG. 1 is a flow chart of one method 100 for automatically generating a search query. The processing of the method 100 is implemented in a computer-readable medium as a service integrated with existing software products or as a standalone product. In one embodiment, the processing of the method 100 is implemented as a feature within one or more existing Customer Relationship Management (CRM) products.

Initially, at 110, a search constraint and a control field identifier are received from an end-user or an automated application interfaced to an Application Programming Interface (API). In the case where the search constraint and the control field identifier are received from an end-user, the end-user interacts with a Graphical User Interface (GUI) that accesses the API and modules of the API provide the search constraint and the control field identifier to the processing of the method 100. In the case where the search constraint and the control field identifier are received from an automated application, the automated application directly accesses modules of the API and these modules provide the search constraint and control field identifier to the processing of the method 100.

The search constraint defines search operators and operands for a desired search within a data store. The data store can be a data warehouse including a plurality of disparate data bases logically integrated with one another, or alternatively the data store can be a single database. The control field identifier identifies a field within the data store that is to be used as a search filter on any search results that are returned should a search query execute using the search constraint.

By way of example, consider a search constraint logically defined as a search operators and operands designed to return all hotel stays and car rentals for unique travel customers, and the control field identifier is logically defined as a trip identifier field within the data store. The trip identifier is a field in the data store that is unique for each trip that a customer takes. The trip includes one or more geographic locations that a customer visited during a particular trip. Moreover, the trip includes a plurality of customer transactions (e.g., hotel stays, car rentals, airline tickets, meals purchased at restaurants, tours purchased from travel agencies, and the like).

Using for purposes of illustration only the present example, a business analyst accesses a GUI CRM application for purposes of providing a hotel stay and car rental search constraint and a travel identifier control field identifier. The GUI application passes the search constraint and control field identifier to one or more API modules, the API modules passes the search constraint and control field identifier to the processing of the method 100. The business analyst desires to generate a customer segmentation population for travel customers that stayed in a hotel and rented a car during the same trip. This population can be used to market travel packages that include both hotel stays and car rentals to those customers that are deemed to be the most likely to take advantage of such packages.

Once the processing of the method 100 receives the search constraint and the control filed identifier; a search query is automatically generated at 120. The search query is initially generated such that a search query is generated that if executed would return first records from the data store that satisfy a least one aspect of the search constraint. Thus, in our continuing example, search logic (e.g., SQL or other data store searching syntax) is generated that if executed would return data store records where hotel stays or car rentals were made by the same customer.

The first records returned are over inclusive in that they will include many records where there are car rentals but no hotel stays or where there are hotel stays but no car rentals. Each record returned will also include values for its control field identifier (in our example the trip identifier field). To account for this over inclusiveness the search query is modified at 130.

Modification to the search query occurs by inserting searching join of merge logic into the search query at 130. The join is performed such that if executed the first records are merged into second records when values for the control field identifier are identical.

Thus, in our present example, the search query is modified to include a join operation on the values for the trip identifier (control field identifier). This join when executed will merge first records having only a hotel stay with records having a car rental when the trip identifier value assigned to each of these first records are the same. Therefore, the generated and modified search query when executed will return unique customer identifications for unique trips taken by those customers where within those unique trips the customers had a hotel stay and rented a car. These customer identifications serve as the customer segment population for the business analyst to conduct a marketing campaign.

After the search query is generated and modified it can be automatically executed or executed by a manually executed query command at 140. The search query can also be saved, stored, or configured to execute automatically at configurable periods. In one embodiment, the search query is an executable SQL file.

Once executed, the search query returns results from the data store that represent unique customer identifications for the second records at 141. The second records are merged first records where the control field identifier values are the same for each set of merged first records that when combined fully satisfy the search constraint. The customer identifications serve as a customer segment population that was defined by the search constraint and the control field identifier. The customer segmentation population is used to market goods or services to customers as defined by a desired marketing campaign.

Conventionally, the ability to automatically generate a search query for purposes of defining a customer segment population was not available. Thus, in the industry today, the technique used to generate a desired customer segmentation population is for a business analyst to define a search constraint and pass this over to a searching specialist. The business analyst must then wait for the searching specialist to develop a search query and send it to the business analyst for execution. In this invention no search specialist is needed at all and the business analyst can define his/her customer segment populations and have this automatically embodied in an executable search query for purposes of acquiring immediate results.

FIG. 2 is a flowchart of another method 200 for automatically generating a search query. Again, the processing of the method 200 is implemented in a computer readable medium as modifications to existing CRM products or as a standalone product.

At 210 an Application Programming Interface (API) is provided with a variety of modules and command options for generating and executing search queries. The API receives a search constraint and control field identifier. These items can be received from a GUI application interfaced to the API or from automated applications.

In the embodiments that include a GUI application, the GUI application includes one or more editable fields for receiving the search constraint and the control field identifier. Other fields may include options to select one or more data stores for which the search constraint and control field identifier are being provided. The data store(s) can be manually supplied by an end-user in the GUI application or can be available for selection via pull-down menus for a list of available data stores.

The search constraint can include a single search operand and operator or a plurality of search operands and operators. Additionally, the operands and operators can be manually supplied or selected from pull-down menus within the GUI application.

At 211, the search constraint and control field identifier are received by the API from a GUI application. Conversely, at 212 the search constraint and control field identifier are received by the API from an automated application. At 220, a search generating module is provided which is interfaced and in communication with the API. The search generating module is capable of automatically generating a search query using the any received search constraint and control field identifier.

One example technique for generating a search query is for the search generating module to generate an executable SQL search query. For example, consider a marketing campaign where a business analyst desires to identify all customers of an Automated Teller Machine (ATM) that have used an ATM less than twice in a given year. In this example, some customers will not appear in a data store table representing ATM transactions since they have never used the ATM.

In this example, the business analyst interacts with a GUI application to select an ATM transaction data store and a general accounts data store. The business analysts provides a search constraint that identifies fields of transaction number and date of transaction and provides values of greater than 0 and 2002 (this could also be a value expressed in arithmetic terms, e.g., Aug. 18, 2002 to Aug. 18, 2003, and the like), respectively. Next, the business analyst provides to the GUI application a control field identifier of account identification.

Once the GUI application has the search constraint and control field identifier, it passes this information to the API. The API then provides this information as parameters to the search generating module. The search generating module then constructs a SQL query that will satisfy the search constraint and control field identifier.

One technique to generate the search query is to generate SQL logic that will perform two separate searches. The first search is for accounts that have ATM access from the general accounts data store and have a no transaction record in the ATM transaction data store for the given time period. The second search is for transaction numbers from the ATM transaction data store that are equal to one within the given time period (within the last year). Next, the search generating module generates SQL to perform a join or merge on the two separate search results. The join provides all accounts that have ATM access and have used an ATM either once or not at all within the last year. These accounts are associated with customer identifications and can then be used by the business analyst to conduct a focused marketing campaign on these identified customers.

Of course other examples can be used, such as search query generation for travel marketing campaigns as was discussed in detail with FIG. 1. Thus, for example, a business analyst can interface with a GUI application to provide search constraints for fields of a travel data store where number of hotel stays and car rentals are greater than 0. The business analyst can also provide a control field identifier that identifies a trip identifier. This information is then passed to the API which forwards the same to the search generating module. The search generating module then generates SQL search logic that searches the travel data store for records where hotel stays and car rentals are both greater than 0 for the same customer identification values. Next, search logic is inserted into the search query to join the results based on same values assigned in the travel identifier field (control field identifier). Thus, when this generated search is executed, the business analyst receives customer identifications, where each of these customers took a single trip and during that trip had both a hotel stay and rented a car. The results serve as a customer segmentation population for the business analyst's travel marketing campaign.

The search generating module can produce an executable search query that is designed to capture a customer segment population for a marketing campaign. The search query does not need to be automatically executed, but can be in some embodiments. Thus, in one embodiment, the search query is generated by the search generating module and then saved for execution when instructed to do so by the API, where the API is interfaced to a GUI application being used by an end-user or an automated application. Moreover, in some embodiments, the generated search query can be designed to execute at configurable periods. Thus, the search query can be automatically executed once a week, once a month, once a quarter, once a year, or at any other business analyst desired interval.

When the search query is executed then the records returned can be presented to a GUI application, an automated application, or other business systems or services. Accordingly, at 230, the API can be interfaced to a variety of other applications to more easily consume and use the records returned from an executed search query.

In some embodiments, the API interfaces with the search generating module and other applications over a network. The network can be a Wide Area Network (WAN), a Local Area Network (LAN), or a combination WAN and LAN. The network can be hardwired, wireless, or a combination of hardwired and wireless.

Furthermore, in some embodiments, the record results returned from an executed search query can be integrated with other applications to provide various electronic views of the results. In some embodiments, one such view is presented within a GUI application as series of expandable and traversable hierarchies. These hierarchies are linked to other fields of the data store, such that the analyst can automatically view different customer identifications returned as they related to other values or fields in the data store. For example, a particular set of customers returned from the executed search query may be associated with customers associated with subscriptions to automatic electronic mail opportunities or with customers that belong to a customer loyalty program. Some options within the GUI can permit just the hierarchy of these identified customers to be displayed within the GUI application for further analysis by a business analyst. Of course a plurality of different hierarchies and/or views can be provided and are intended to fall within the scope of this invention.

FIG. 3 is a block diagram representing one search query generation system 300 of the invention. The search query generation system 300 is implemented in a computer-readable medium. The search query generation system 300 can be used to implement the processing of the methods 100 and 200 presented above.

The search query generation system 300 includes a search query interface 301 and a search generating module 302. The search query interface is operable to receive a search constraint and control field identifier from either an end user 310 or another application 320 (e.g., GUI application or automated application). Thus, the search query interface 301 can be an API (such as the one described in FIGS. 1 and 2) or it 301 can be a combined API and GUI application that interacts directly with the end-user 310.

The search query interface 301 is designed to receive, identify, and provide the search constraint to the search generating module 302. In some embodiments, the search query interface 301 and search generating module 302 can be combined as a single software module, service, or system.

The search generating module 302 automatically and dynamically generates instances of search queries. These queries can be automatically executed or saved and executed when command options indicate that they are to be executed. The command options can be manually made by end-users 310 or made based on configurable events (e.g., periodically at defined times).

The search generating module builds executable search logic for searching a data store(s) based on the search constraint and the control field identifier. The generated search includes an outer search that obtains records from the data store that satisfy at least a portion of the search constraint. Next, these records are filtered or merged with search logic that only retains records that have identical values for the control field identifier for a same customer identification value. Accordingly, the final returned records from an executed search query represent a customer segmentation population for a desired marketing campaign of a business analyst.

Additionally, in some embodiments, the search query generation system 300 can be interfaced with a customer segmentation module. This permits a business analyst to automatically import the customer segment population obtained by executing the search query into an existing tool or system where the results can be more effectively used to analyze or execute the desired marketing campaign.

Also, in one embodiment, the results or records returned from an executed search can be organized and viewed as customized hierarchies. Thus, some of the records can be identified as related and belonging to a similar hierarchy (same loyalty group, same subscription service, and the like). The records can then be displayed or presented based on similar relationships or hierarchies or viewed as a whole group with visual clues as to each record's relationship with one another within the whole group. The relationships or hierarchies can be interacted with and altered in an automated fashion. This permits the business analyst to further analyze the returned records (customer segment population) in his/her effort to execute a desired marketing campaign.

Figure 4:
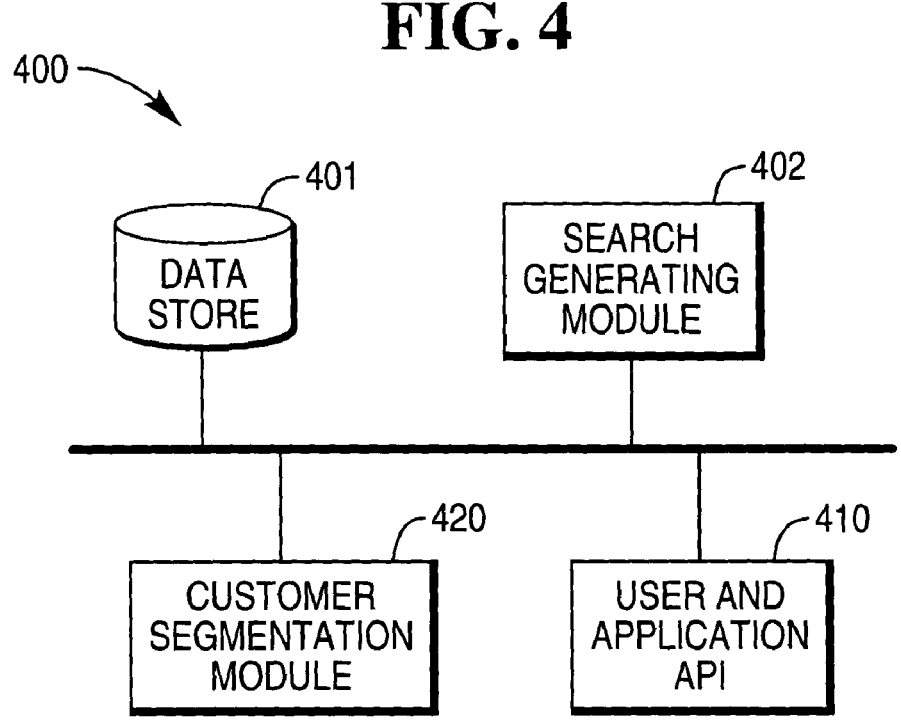
FIG. 4 depicts a block diagram representing another search query generation system, according to one embodiment of the invention.

FIG. 4 is a block diagram representing another search query generation system 400. The search query generation system 400 resides and is implemented in a computer-readable medium.

The search query generation system 400 includes a data store 401 and a search generating module 402. The search query generation system 400 interacts over a network 403 with a user and application API 410, and optionally is also integrated with one or more customer segmentation modules or tools 420.

The data store 401 can be a single data base or a plurality of databases that are logically associated with one another as a data warehouse. The data store 401 houses business information for an organization. This information is captured and organized by a business based on its needs and desires. The data store 401 is frequently mined and used by business analysts to identify customer segment populations for desired marketing campaigns.

The search generating module 402 uses a search constraint and a control field identifier to construct a search query. The search query when executed returns records from the data store 401 that satisfy the search constraint and have identical field values for the control field identifier for a same customer identification value associated with a customer identification field.

The search generating module 402 generates executable search logic that represents a search query. The search query includes a join operation which filters records returned from the data store 401 that satisfy the search constraint such that only records that include the same values for customer identifications and the control field identifier remain. The generated search query can be automatically executed, executed based on configurable events, or executed by manual operation. The records returned represent a customer segmentation population for a marketing campaign desired by a business analyst. In some embodiments, the records returned can be automatically provided to other applications or tools of a business analyst, such as other customer segmentation modules 420.

In one embodiment, the search query generation system 400 is used to generate a customer segmentation population based on a marketing campaign having a business analyst defined search constraint and a control field identifier identified as a trip identifier. Furthermore, the search constraint can include limitations based on hotel stays, car rentals, travel destinations, travel layovers, and others. Of course other marketing campaigns associated with other industries can be used with the teachings of this invention and all such instances are intended to fall within the broad scope of this invention.

The various embodiments of this invention teach how an automated search can be generated for business analysts that are attempting to generate customer segmentation populations for marketing campaigns of an organization. These embodiments alleviate the need of these business analysts to engage search specialist to customize and develop the necessary search queries. In this way, marketing campaigns can be more timely implemented and can be more frequently implemented within an organization in an effort to improve an organization's relationship with its customers and increase sales of goods and services offered by the organization.

The above description is intended to be illustrative, and not restrictive. Many other embodiments will be apparent to those of skill in the art upon reviewing the above description. The scope of embodiments of the invention should, therefore, be determined with reference to the appended claims, along with the full scope of equivalents to which such claims are entitled.

The Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Description of the Embodiments, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject mater lies in less than all features of a single disclosed embodiment. Thus the following claims are hereby incorporated into the Description of the Embodiments, with each claim standing on its own as a separate exemplary embodiment.

What is claimed is:

1. A computer-implemented method for providing a search query residing in a non-transitory computer-readable storage medium and executing on a computer, comprising:
   providing, by the computer, an Application Programming Interface (API) for receiving a search constraint and a control field identifier;
   providing, by the computer, a search generating module interfaced to the API for automatically generating a search query from the search constraint, the search constraint defines an operand and an operator for the search query being generated and the control field identifier defines a control field of a data store from which search results obtained from executing the search query are to be filtered via a join and the control field identifier is separate and apart from the search constraint;
   executing the search query to produce records from the data store, the records representing the search results that satisfy the search constraint and the search results are initially over inclusive indicating that initially there are more of the search results than are necessary to satisfy the search query, the records are then filtered using a control field value assigned to the control field identifier by joining those records from the search results that have identical values as that which is assigned to the control field value to reduce the search results by producing second records, each second record having control field values for the control field identifier that are identical, the search query modified to include a filter that performs the filtering on the records to produce the second records; and
   interfacing, by the computer, the records automatically after the search query is executed with a marketing campaign module to generate a customer segmentation population based on a marketing campaign's search constraint representing an instance of the search constraint.

2. The method of claim 1 further comprising providing, by the computer, a command option within the API to manually execute the search query.

3. The method of claim 2 further comprising presenting, by the computer, the records when the command option is selected.

4. The method of claim 1 wherein the providing of the search generating module further includes interfacing the API to the search generating module over a network.

5. The method of claim 1 wherein the providing the API further includes interfacing the API to one or more automated applications.

6. The method of claim 1 further comprising generating, by the computer, hierarchies from portions of the records when the search query is executed, wherein each hierarchy represents an aspect of the search constraint.

7. A computer implemented search query generation system, comprising:
   a search query interface implemented and residing within a non-transitory computer-readable medium and to execute on a computer; and
   a search generating module implemented and residing within a non-transitory computer-readable medium and to execute on the computer;
   the search query interface is operable to receive a search constraint and a control field identifier, and the search generating module generates a search query by using the search constraint to return records of a data store that satisfy the search constraint, and the search constraint defines a search operand and a search operator and the control field identifier defines a control field of the data store against which search results for the search query are filtered, the search results initially returns records that are over inclusive in terms of information indicating there is initially more of the information than is necessary to satisfy the search query, and the control field identifier is separate and apart from the search constraint, and the control field identifier defines a particular field in the data store that is used as a search filter on the over inclusive records of the search results, the search filter is a join that is performed against the over inclusive records of the search results to obtain second records from the records of the search results, the second records having an identical value as that which is assigned to the control field identifier, the system is interfaced to a customer segmentation module and used to generate a customer segmentation population based on a marketing campaign's search constraint representing an instance of the search constraint.

8. The search query generation system of claim 7 wherein the search query interface includes a Graphical User Interface (GUI) application for receiving the search constraint and the control field identifier and an Application Programming Interface (API) that interfaces the GUI application to the search generating module.

9. The search query generation system of claim 7 wherein the search generating module automatically executes the search query and presents the records to the search query interface.

10. The search query generation system of claim 7 wherein the search generating module executes the search query and presents the records to the search query interface when instructed to do so by the search query interface.

11. The search query generation system of claim 10 wherein the search query interface assembles and links the records after the search query is executed into logically related hierarchies and presents the hierarchies within the search query interface.

12. The search query generation system of claim 11 wherein the hierarchies are linked to fields in the data store and can be activated from the search query interface to present different views of the hierarchies.

13. A computer-implemented search query generation system comprising:
   a data store implemented and residing within a non-transitory computer-readable medium and accessible via a computer; and
   a search generating module implemented and residing within a non-transitory computer-readable medium that generates a search query, the search generating module also executes on the computer;

the search generating module uses a search constraint and a control field identifier to construct the search query and a search filter on search results returned from executing the search query, the search results initially return over inclusive records indicating that there is initially more of the over inclusive records than are necessary to satisfy the search query, and the search query when executed returns the over inclusive records from the data store that satisfy the search constraint, and the search constraint defines at least a search operator and a search operand and the control field identifier defines a control field in the data store against which the over inclusive records of the search results for the search query are filtered and the control field identifier is separate and apart from the search constraint, and the control field identifier defines a particular field in the data store that is used as the search filter on the over inclusive records of the search results, the search filter performs a join against the over inclusive records of the search results to obtain second records having an identical value as that which is assigned to the control field identifier, and the system is interfaced to a customer segmentation module that is used to generate a travel customer segmentation population based on a marketing campaign's search constraint representing an instance of the search constraint and wherein the control field identifier is a trip identifier.

14. The search query generation system of claim 13 wherein the marketing campaign's search constraint includes at least one of a hotel stay constraint, a rental car constraint, a destination constraint, and a layover constraint.

* * * * *